(12) United States Patent
Weldy

(10) Patent No.: US 7,384,090 B1
(45) Date of Patent: Jun. 10, 2008

(54) FOLDABLE TONNEAU COVER

(75) Inventor: Ross Weldy, Elkhart, IN (US)

(73) Assignee: Advantage Truck Accessories, Inc., Elkhart, IN (US)

( * ) Notice: Subject to any disclaimer, the term of this patent is extended or adjusted under 35 U.S.C. 154(b) by 0 days.

(21) Appl. No.: 11/555,357

(22) Filed: Nov. 1, 2006

Related U.S. Application Data

(63) Continuation-in-part of application No. 10/940,561, filed on Sep. 13, 2004.

(51) Int. Cl.
*B60P 7/04* (2006.01)

(52) U.S. Cl. ............... 296/100.16; 296/98; 296/100.18

(58) Field of Classification Search .................. 296/98, 296/100.01, 100.06, 100.08, 100.09, 100.11, 296/100.12, 100.14, 100.17, 100.18, 136.04, 296/136.03
See application file for complete search history.

(56) References Cited

U.S. PATENT DOCUMENTS

| | | | | |
|---|---|---|---|---|
| 5,752,736 A | * | 5/1998 | Nodier ................. | 296/100.18 |
| 5,984,400 A | * | 11/1999 | Miller et al. ........... | 296/100.15 |
| 6,257,306 B1 | * | 7/2001 | Weldy ........................ | 160/327 |
| 6,257,647 B1 | * | 7/2001 | Ninness et al. ........ | 296/100.15 |
| 6,616,212 B1 | * | 9/2003 | Bishop .................. | 296/100.18 |
| 6,619,719 B1 | * | 9/2003 | Wheatley ............... | 296/100.15 |
| 6,905,162 B2 | * | 6/2005 | Lester et al. ........... | 296/100.18 |
| 6,942,279 B1 | * | 9/2005 | Hoover ....................... | 296/159 |
| 6,948,761 B2 | * | 9/2005 | Haack et al. .......... | 296/100.18 |
| 7,021,694 B1 | * | 4/2006 | Roberts et al. ........ | 296/100.18 |
| 7,100,961 B2 | * | 9/2006 | Moen et al. ........... | 296/100.18 |
| 7,147,265 B1 | * | 12/2006 | Schmeichel ............ | 296/100.14 |
| 7,188,888 B2 | * | 3/2007 | Wheatley et al. ...... | 296/100.04 |

\* cited by examiner

*Primary Examiner*—Dennis H. Pedder
*Assistant Examiner*—Greg Blankenship
(74) *Attorney, Agent, or Firm*—Botkin & Hall, LLP

(57) ABSTRACT

A flexible tonneau cover for trucks that is easily folded for storage or shipping. The tonneau cover has a collapsible peripheral frame, with supporting bows spanning the width of the frame. The bows include separable parts for storage or shipping and can be assembled and expanded to spread the frame.

4 Claims, 4 Drawing Sheets

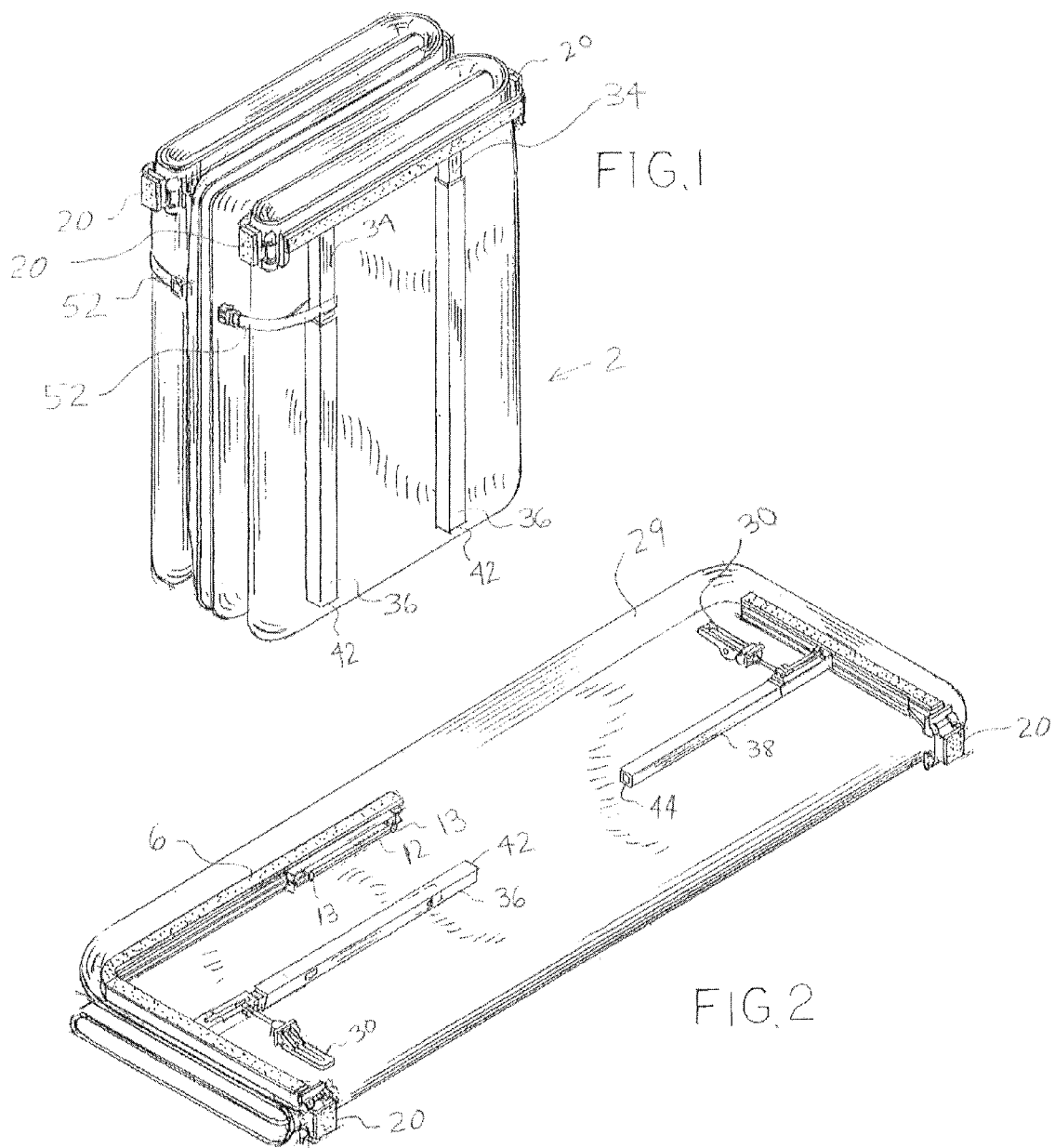

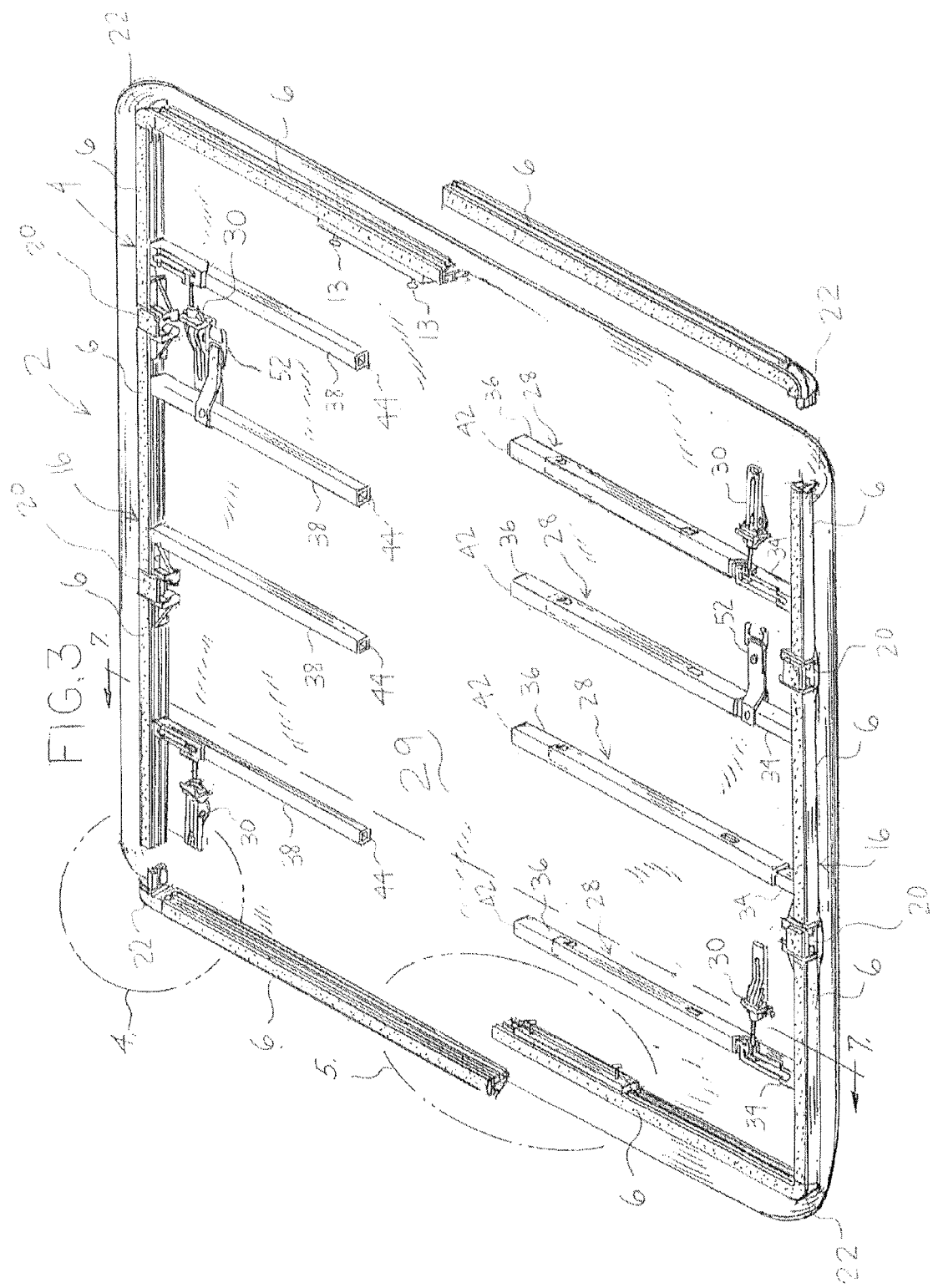

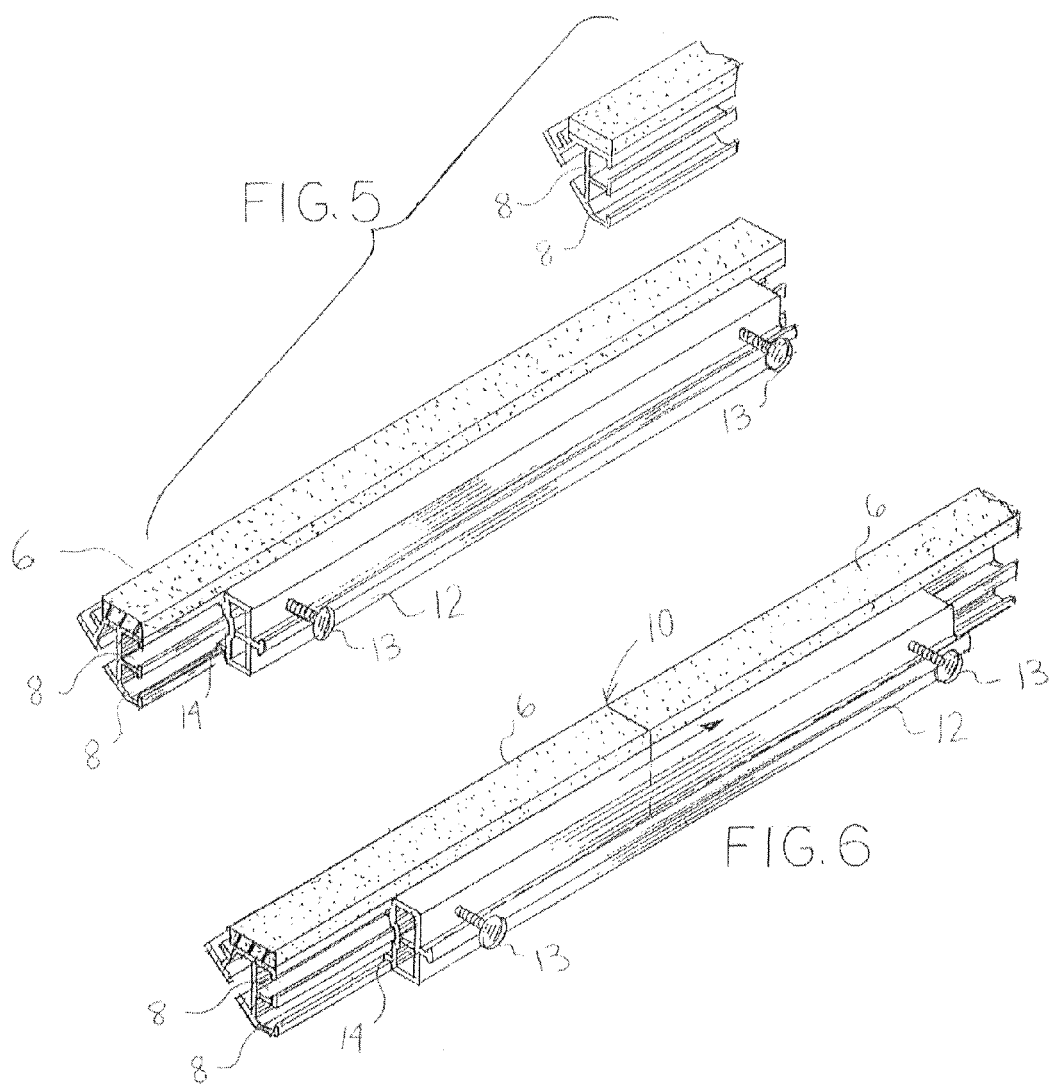

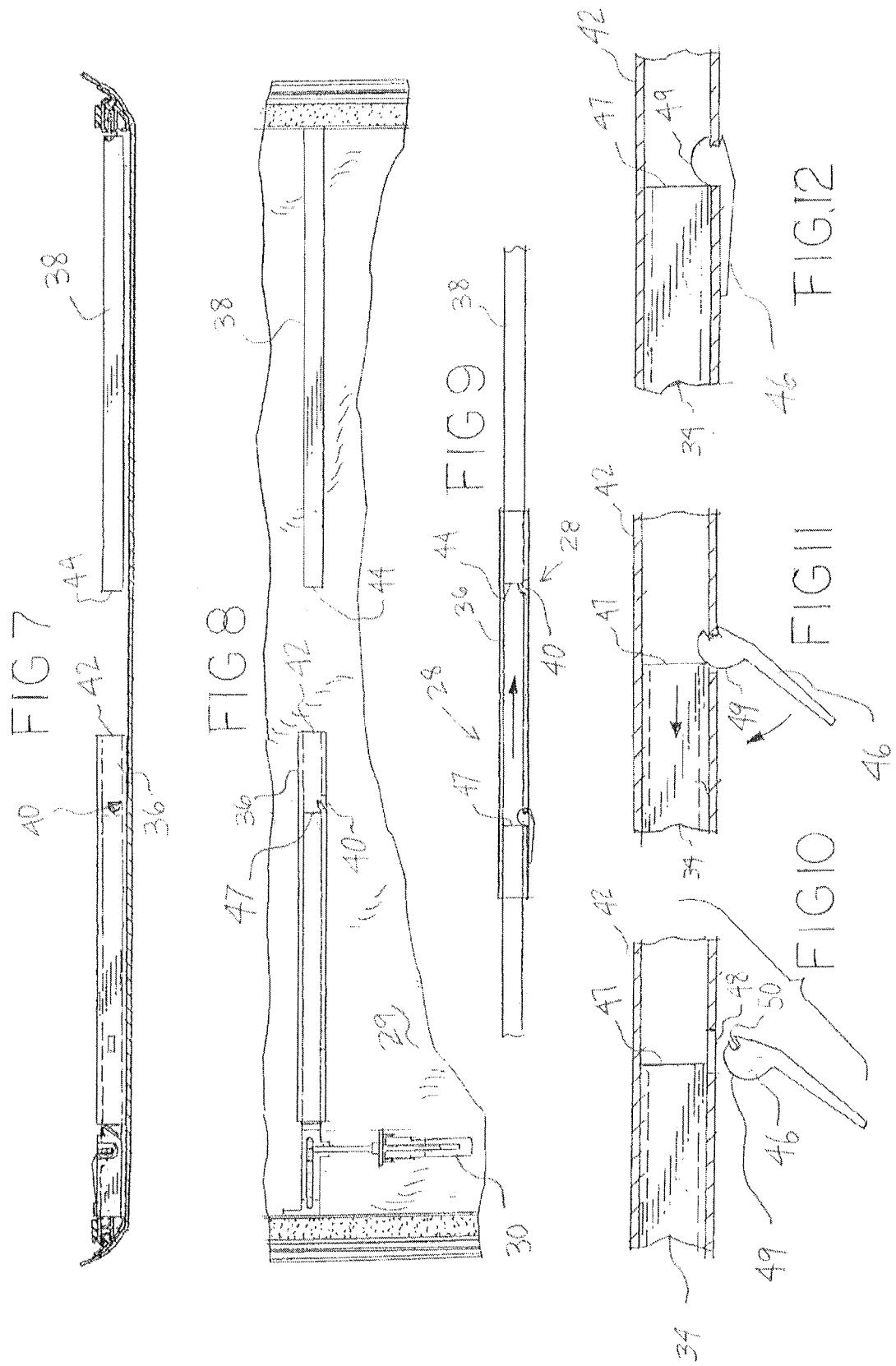

FOLDABLE TONNEAU COVER

CROSS-REFERENCE TO RELATED APPLICATION

This application is a continuation-in-part of U.S. application Ser. No. 10/940,561, filed Sep. 13, 2004, the disclosure of which is herein incorporated by reference.

BACKGROUND OF THE INVENTION

This invention relates to a flexible tonneau cover for pick-up trucks. Tonneau covers are to serve the purposes of protecting the contents of a truck bed from the elements, as well as provide a more streamlined surface than just an open truck bed. A drawback to tonneau covers is that shipping them may be difficult due to their size and weight. Such covers can be bulky to ship because a frame is necessary to support the flexible cover and the frame is necessarily large to provide support over a pick-up truck bed.

SUMMARY OF THE INVENTION

The present invention is a tonneau cover for pick-up trucks. The tonneau cover has a peripheral frame and a flexible cover. The peripheral frame is made from rail sections and has bows that span across the width of the peripheral frame to support the flexible cover. The bows have three main components which are: first and second tubes and a sliding tube. The sliding tube is carried by the first tube and slides over the first tube and onto the second tube to form a bridge across them. This provides continuous support across the width of the cover's peripheral frame, which prevents the flexible cover from sagging. The sliding tube includes a locking lever or cam tool. The cam tool produces a force that spreads the bow apart and thereby stretches the flexible cover for a smooth appearance.

An object of this invention is to provide a tonneau cover with a smooth appearance.

Another object of this invention is to provide a tonneau cover that does not sag.

Another object of this invention is to provide a tonneau cover that may be folded into a small package for shipping.

Other objects of this invention will become apparent upon a reading of the following description.

BRIEF DESCRIPTION OF THE DRAWINGS

FIG. 1 is a perspective view showing the tonneau cover folded in its most compact form;

FIG. 2 shows the tonneau cover partially un-folded;

FIG. 3 shows the tonneau cover unassembled and completely unfolded.

FIG. 4 is a fragmentary detailed view taken within broken line circle 4 seen in FIG. 3;

FIG. 5 is a fragmentary detailed view taken within broken line oval 5 seen in FIG. 5;

FIG. 6 shows the rail sections joined together by the locking member to make a lateral peripheral frame member;

FIG. 7 is a sectional view taken along line 7-7 of FIG. 3;

FIG. 8 is an upper view of the frame members seen in FIG. 7;

FIG. 9 shows the sliding tube in locked position;

FIG. 10 shows how the cam tool or lever prior to its insertion into the sliding tube;

FIG. 11 shows how the cam tool or lever inserted into the sliding tube; and

FIG. 12 shows the cam tool or lever in its closed position locking the sliding tube.

DETAILED DESCRIPTION OF THE INVENTION

The tonneau cover 2 of this invention has a peripheral frame 4 made from rail sections 6. The rail sections 6 may be made of extruded aluminum or other lightweight, durable material to reduce the overall weight of the tonneau cover 2. Each rail section 6 has slots 8 as shown in FIG. 5 that run the entire length of each rail section. End frame members 10, which span the width of the pick-up bed, are each formed by joining multiple rail sections 6 using a locking member 12 as shown in FIG. 6. The locking member has protrusions or keys 14 along its entire length that mate with the slots 8 in the rail sections 6 allowing the locking member 12 to be slid longitudinally into a closed position which spans two adjacent abutting rail sections 6. Screws 13 secure the locking member to the rail sections in its closed position. When the locking member 12 is slid into its open position onto a rail section 6, the end frame member can be broken down into smaller pieces, which allows the tonneau cover to be folded in to a smaller package when not in use. In the preferred embodiment two rail sections 6 are used to make one end member 10, however more could be used. Longitudinal or side frame members 16 run down the sides of the cover and are made from rail sections 6 that are joined by hinges 20. The hinges 20 allow the tonneau cover 2 to be lifted in parts to access the underlying truck bed, and also allow the tonneau cover 2 to be folded. Side frame members 16 and end frame members 10 are joined to form the peripheral frame 4 by corner pieces 22. Each corner piece has tabs 24 that are received into the slots 8 in the adjacent rail sections 6 to form a corner of the cover as shown in FIG. 4. Once the tabs are inside the rail sections 6, screws 26 are tightened to secure the corner pieces 22 into the rail sections.

Inside the peripheral frame 4 are bows 28, which span the width of the peripheral frame 4 and support a flexible cover 29. Clamps 30 used to hold the tonneau cover 2 to the bed of a truck are attached to the bows 28 as shown in FIG. 3. Each bow 28 includes a tube 34 which is secured at one end to a frame member 16, a sliding tube 36, and a mating tube 38 which is secured at one end to the opposite frame member 16. The tube 34 and the mating tube 38 have the same cross section. The sliding tube 36 fits telescopically over tube 34. The sliding tube 36 is slid from tube 34 onto the aligned tube 38 until protrusion 40 formed in tube 36 contacts the end of tube 38, as shown in FIG. 9. At this point, a slot 48 formed in the sliding tube is located at the outer end 47 of tube 34 as seen in FIG. 10. A cam tool or lever 46, normally stored in a clamp 30, is used to expand the bow. Lever 46 includes a cam part 49 and a notch 50. Cam part 49 is inserted into the slot 48 in the sliding tube 36 against end 47 of tube 34 and notch 50 is fitted over the edge of the slot. The lever 46 is rotated toward tube 36 as shown in FIG. 11 into its locked position as shown in FIG. 12 where it remains until rotated away from the tube. As the lever 46 rotates into its locked position, cam part 49 in contact with tube end 47 cams and urges tube 34 rearwardly relative to tube 36 thereby spreading tubes 34, 38 apart. This creates a force that spreads the peripheral frame 4 in a lateral direction. Flexible cover 29 is attached around the perimeter of the peripheral frame, and the force from the bows 28 holds the flexible cover 29 taut to give it a smooth appearance. A taut flexible cover 29 is less likely to sag and collect water, which over time can degrade the appearance of the flexible cover 29.

When the tonneau cover 2 is shipped or stored it can be folded into a relatively small package. The hinges 20 which connect rail sections 6 in the side frame members 16 which run the length of the truck bed allow the tonneau cover 2 to be folded length wise as shown in FIG. 2. The tonneau cover 2 may also be folded in half down its width by sliding the locking members 12 along a rail section 6 to a position that allows the rails sections 6 forming the lateral frame members 10 to be separated, as shown in FIG. 2. Once one of the rail sections 6 and its corner piece 22 forming each of the end frame members 10 is removed and sliding tubes 36 are withdrawn from tubes 38 with levers 46 removed and stored in clamps 30, the tonneau cover 2 may be folded along its width to the configuration shown in FIG. 1. Mating straps 52 may then be attached to keep the tonneau cover 2 in its fully folded position as shown in FIG. 1. This fully folded configuration makes shipping the tonneau cover 2 more affordable since smaller packages are generally cheaper to ship than large awkward packages.

To assemble the cover, first the removed rail sections 6 with their corner pieces are reconnected and the peripheral frame 4 assembled with locking members 12 secured in their locked positions. Then sliding tubes 36 are slid over aligned tubes 38 of bows 28 and the tubes 34, 38 expanded longitudinally by levers 46.

The above-described invention is not to be limited to the details above, but may be modified in accordance with the following claims.

What is claimed is:

1. A tonneau cover for the bed of a truck, said cover comprising:
   a peripheral frame mountable to said truck, said frame having separable parts which when separated cause the frame to be collapsed to a smaller size when not in use;
   a flexible cover mounted to said frame and being foldable when said frame is collapsed; and at least one bow spanning said frame under said flexible cover, said bow having separable parts which when separated allows the frame to be collapsed, said bow includes a cam part for spreading said bow parts toward said frame.

2. A tonneau cover for the bed of a truck, said cover comprising:
   a peripheral frame mountable to said truck, said frame having separable parts which when separated cause the frame to be collapsed to a smaller size when not in use;
   a flexible cover mounted to said frame and being foldable when said frame is collapsed; and at least one bow spanning said frame under said flexible cover, said bow having separable parts which when separated allows the frame to be collapsed, said bow includes a cam part for spreading said bow parts toward said frame,
   wherein two of said bow parts are attached to said frame, a third of said bow parts is slidably fitted over said two bow parts and restricted against movement relative to one of the two bow parts, said cam part pivotally carried by said third bow part and engaging the other of said two bow parts, said cam part constituting means for urging said two bow parts outwardly toward said frame when the cam part is pivoted relative to said third bow part.

3. A tonneau cover for the bed of a truck, said cover comprising:
   a peripheral frame mountable to said truck, said frame having separable parts which when separated cause the frame to be collapsed to a smaller size when not in use;
   a flexible cover mounted to said frame and being foldable when said frame is collapsed; and at least one bow spanning said frame under said flexible cover, said bow having separable parts which when separated allows the frame to be collapsed, said bow includes a cam part for spreading said bow parts toward said frame,
   wherein two of said bow parts are attached to said frame, a third of said bow parts is slidably fitted over said two bow parts and restricted against movement relative to one of the two bow parts, said cam part pivotally carried by said third bow part and engaging the other of said two bow parts, said cam part constituting means for urging said two bow parts outwardly toward said frame when the cam part is pivoted relative to said third bow part, said third bow part has a slot, said cam part extending through said slot and contacting said other bow part.

4. A tonneau cover for the bed of a truck, said cover comprising:
   a peripheral frame mountable to said truck, said frame having separable parts which when separated cause the frame to be collapsed to a smaller size when not in use;
   a flexible cover mounted to said frame and being foldable when said frame is collapsed; and at least one bow spanning said frame under said flexible cover, said bow having separable parts which when separated allows the frame to be collapsed, said bow includes a cam part for spreading said bow parts toward said frame,
   wherein two of said bow parts are attached to said frame, a third of said bow parts is slidably fitted over said two bow parts and restricted against movement relative to one of the two bow parts, said cam part pivotally carried by said third bow part and engaging the other of said two bow parts, said cam part constituting means for urging said two bow parts outwardly toward said frame when the cam part is pivoted relative to said third bow part, said third bow part has a slot, said cam part extending through said slot and contacting said other bow part, said cam part is removable from said third bow part.

* * * * *